No. 623,431. Patented Apr. 18, 1899.
A. C. SCHAEFER.
DRIVE CHAIN AND CHAIN WHEEL.
(Application filed Sept. 2, 1898.)
(No Model.) 2 Sheets—Sheet 1.
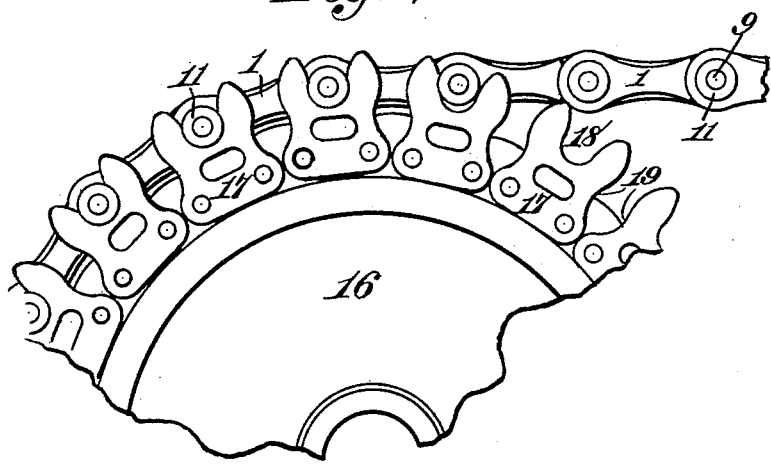
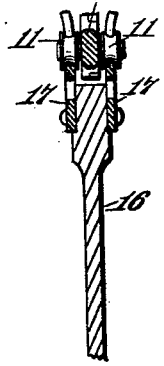
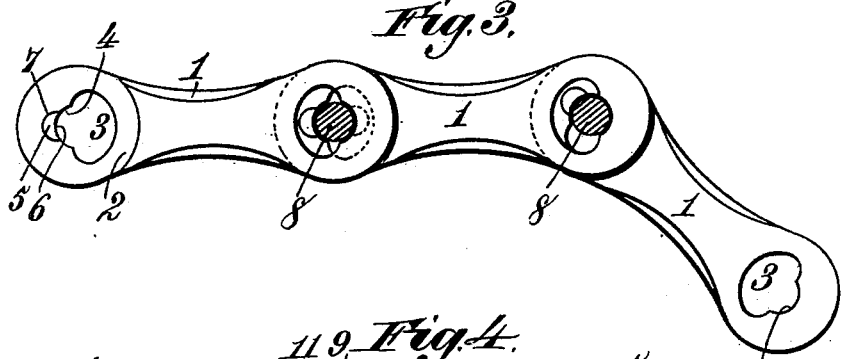
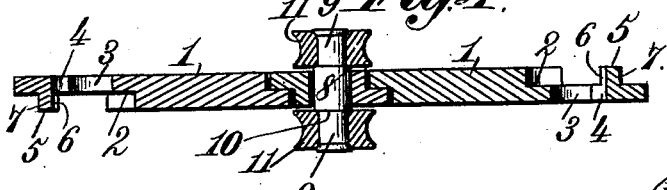
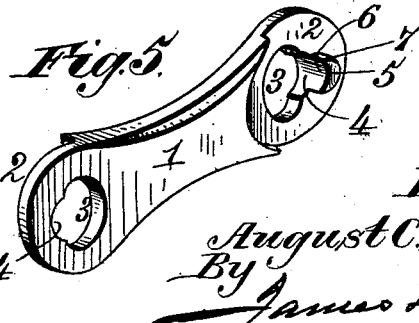
Witnesses.
Inventor.
August C. Schaefer
By James L. Norris.
Atty.

No. 623,431. Patented Apr. 18, 1899.
A. C. SCHAEFER.
DRIVE CHAIN AND CHAIN WHEEL.
(Application filed Sept. 2, 1898.)
(No Model.) 2 Sheets—Sheet 2.
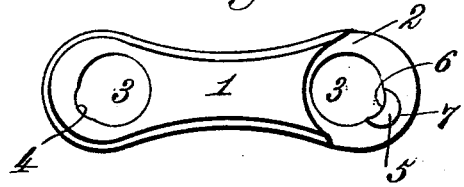
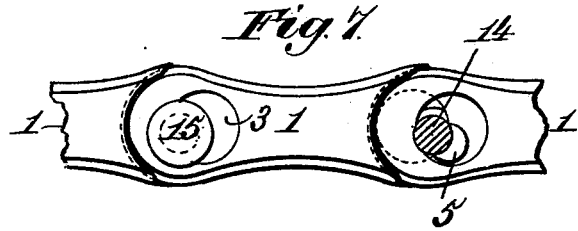
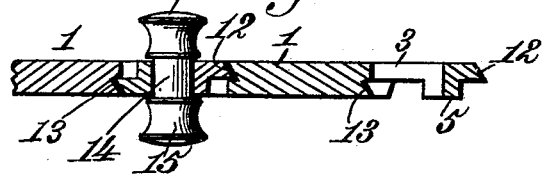
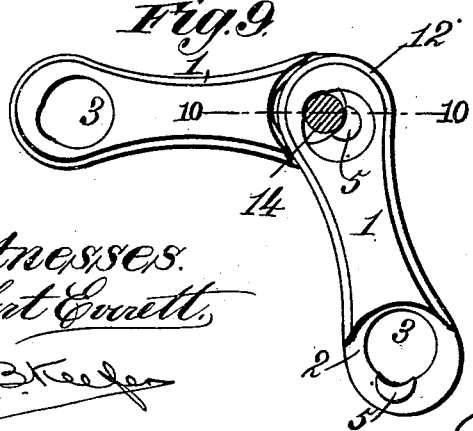
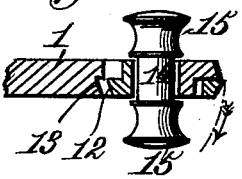
Witnesses.
Robert Everett
H. B. Keefer
Inventor.
August C. Schaefer
By James L. Norris
Atty.

UNITED STATES PATENT OFFICE.

AUGUST C. SCHAEFER, OF ST. PAUL, MINNESOTA.

DRIVE-CHAIN AND CHAIN-WHEEL.

SPECIFICATION forming part of Letters Patent No. 623,431, dated April 18, 1899.

Application filed September 2, 1898. Serial No. 690,119. (No model.)

*To all whom it may concern:*

Be it known that I, AUGUST C. SCHAEFER, a citizen of the United States, residing at St. Paul, in the county of Ramsey and State of Minnesota, have invented new and useful Improvements in Drive-Chains and Chain-Wheels, of which the following is a specification.

This invention relates to drive-chains and chain-wheels, and has for its object to provide an improved drive-chain wherein a broad bearing is furnished for the pivot-pins, whereby the links may be made light and thin and yet possess the necessary strength and durability and by means of which the direction of strain is maintained centrally on the chain. It also has for its object to provide a novel chain-wheel to be used in connection with the improved chain.

To these ends my invention consists in the features and in the construction, combination, and arrangement of parts hereinafter described and particularly pointed out in the claims following the description, reference being had to the acompanying drawings, forming a part of this specification, wherein—

Figure 1 is a view in side elevation of a portion of a drive-chain constructed in accordance with my invention. Fig. 2 is a sectional view taken on the line 2 2 of Fig. 1. Fig. 3 is a view in side elevation of a portion of my improved chain. Fig. 4 is a sectional view of the same. Fig. 5 is a detail perspective view of one of the links. Fig. 6 is a detail view of one of the links of a modified construction of chain. Fig. 7 is a similar view showing two links connected. Fig. 8 is a sectional view thereof. Fig. 9 is a view showing two links in position to be disconnected, and Fig. 10 is a detail sectional view taken on the line 10 10 of Fig. 9.

Referring to Figs. 3, 4, and 5 of the drawings, the numeral 1 indicates one of the links of the preferred form of drive-chain. As shown, said link is rabbeted at its opposite ends, as at 2, to form a circular disk, said rabbets being formed on opposite sides of the link. Each of the disks is provided centrally with an elliptical aperture 3, in the outer wall of which is formed a segmental recess 4. The major axis of the aperture 3 is transverse to the link, and formed on the inner face of each of the rabbeted portions 2 of the link is formed a laterally-projecting lug 5. Said lug, as shown, is crescent-shaped in cross-section, whereby its inner face 6 corresponds with and forms practically a continuation of the walls of the recess 4 and its outer convex face 7 permits of the free oscillation of the links, as will more fully hereinafter appear.

As most clearly shown in Fig. 4 of the drawings, the rabbeted ends or disks of the links overlap each other, forming lap-joints, and are pivotally connected together by pivot-pins, as follows: Each of the pivot-pins consists of a hardened-steel pin having a central cylindrical portion 8 that is slightly greater in diameter than the cylindrical end portions 9, whereby shoulders 10 are formed on the pivot-pins between the central and end portions thereof.

As most clearly indicated in Fig. 3, when the rabbeted ends of the links are overlapped the lug 5 of one link projects into the aperture 3 of the adjacent link and the recesses 4 coact to form a round bolt-hole, in which is fitted the central portion 8 of the pivot-pin. Small antifriction-rollers 11 are fitted over the end portions 9 of the pivot-pin, and the outer ends of said pivot-pin are upset or headed down, thus firmly securing the rollers in place. The shoulders 10 of the pivot-pin act as stops, against which the inner faces of the rollers abut when the pivot-pin is headed down and prevent the rollers from binding against the outer faces of the links. When assembled together in the manner described, the links have the utmost freedom of oscillation relatively one to the other, the elliptical formation of the apertures 3 permitting the lugs 5 to freely move therein, and the convex faces 7 of said lugs avoid the formation of any sharp corners that might bind against the walls of said apertures.

As clearly appears in Fig. 4, the lugs 5 form extensions of the bearing-faces 4, said lugs and bearing-faces forming a bearing for the pivot-pin that is equal to the combined widths of the overlapping ends of the links and extends along the entire length of the central bearing portion 8 of the pivot-pin. As has been before explained, each pivot-pin is embraced between two such bearings, one on each link, and by reason of such construction I am enabled to make the links quite thin, and consequently light, yet provide a broad and extended bearing for the pivot-pins that prevents cutting or unduly wearing said pins and at the same time distributes the strain centrally on the chain.

In Figs. 6 to 10 I have illustrated a slightly-modified chain wherein the numeral 1 indicates the link, 2 the rabbeted ends thereof, 3 the apertures, 4 the recessed bearing-faces, and 5 the projecting lugs, all constructed and arranged in the manner before described. In the modified construction, however, the recessed bearing-faces 4 and lugs 5 are formed slightly below the longitudinal centers of the links, as most clearly shown in Figs. 6 and 7, and the ends of the links are beveled, as at 12. Said beveled edges are adapted to interlock with the undercut or dovetailed shoulders 13 of the rabbeted ends of the links when the chain is in normal position, for the purpose hereinafter described. As shown in Figs. 8 and 10, the pivot-pin 14 and the small pulleys 15 are formed integrally instead of being formed separately and then riveted together, as before described. To assemble two of the pivot-pins, it is only necessary to arrange the pivot-pin in the aperture 3 of one of the links and then by overlapping the corresponding end of the other link at an acute angle, as shown in Fig. 9, the two ends of the links may be fitted together over the pivot-pin. By then straightening out the links the beveled ends 12 are caused to take or turn under the undercut shoulders 13, as shown in Figs. 7 and 8, and prevent the overlapping ends of the links from being lifted off from one another and from over the pivot-pin. To disengage the links, it is only necessary to reverse the operation performed in assembling them—that is to say, by turning the links at an acute angle, as shown in Fig. 9, the beveled end of one link is turned from under the undercut shoulder of the other link. Then by lifting one link from off the other with a slight tipping movement, as indicated by the arrow in Fig. 10, the links may be readily separated and disengaged from the pin.

In Figs. 1 and 2 I have illustrated a chain-wheel especially designed for use in connection with the improved chain described. Referring to said figures the numeral 16 indicates the body of the wheel, which may be constructed in any approved or preferred manner. To the opposite sides of the rim of the wheel are riveted a plurality of metallic plates 17, each of which is bifurcated or forked at its outer end, as at 18. The edges of the plates are preferably fluted, as at 19, and when the plates are secured end to end in place, as shown, said fluted edges form openings or spaces through which dust and dirt may escape. The plates are riveted to the rim of the wheel in such manner that each plate on one side of the wheel registers with a corresponding plate on the other side thereof, and the forked ends of the plates project beyond the periphery of the wheel and are flared outwardly in opposite directions, as shown in Fig. 2. The rollers on the ends of the pivot-pins of the chain are adapted to fit into the forked ends of the plates 17, while the links composing the chain lie between said plates, whereby the line of draft is maintained directly on the center of the wheel. During the movement of the chain around the wheel the rollers carried by the pivot-pins have an axial or rotary movement in the forked ends of the plates or sprockets, thereby reducing the friction and the wear on the rollers and wheels. By forming the plates or sprockets separately from the body of the wheel and attaching them to the rim thereof two important results are attained. First, should one of the sprockets be broken it may be removed and replaced by a new one, and, secondly, a sprocket-wheel of ordinary construction can be converted into a sprocket-wheel suitable for use in connection with my improved chain merely by riveting the forked plates or sprockets to the rim thereof.

Having described my invention, what I claim is—

1. A drive-chain consisting of a series of links having overlapping, apertured ends, each link having a laterally-projecting lug extending into the aperture in the adjacent link, and pivot-pins passing transversely through said apertured and overlapping ends, the said lugs embracing the opposite sides of the pivot-pins and forming extended bearings therefor, substantially as described.

2. A drive-chain consisting of a series of links having overlapping, apertured ends, and segmental recesses formed in the outer walls of said apertures, each link having a laterally-projecting lug extending into the aperture in the adjacent link and concaved on its inner face to register with the segmental recess, and pivot-pins passing transversely through said apertured and overlapping ends and journaled in said segmental recesses and between the concaved lugs, substantially as described.

3. A drive-chain consisting of a series of links having overlapping, elliptically-apertured ends, and segmental recesses formed in the outer walls of said apertures, each link having a laterally-projecting lug extending into the aperture in the adjacent link, said lug having a concaved inner face registering with the segmental recess and a convex outer face, and pivot-pins passing transversely through said apertured, overlapping ends and journaled in said segmental recesses and between the concaved lugs, substantially as described.

4. A drive-chain consisting of a series of links having overlapping, apertured ends, each link having a laterally-projecting lug extending into the aperture in the adjacent link, and pivot-pins passing transversely through said apertured and overlapping ends, the said lugs embracing the opposite sides of the pivot-pins and forming extended bearings therefor, said pivot-pins projecting at their opposite ends beyond the outer faces of the overlapping ends and provided with antifriction-rollers, substantially as described.

5. The combination with a chain-wheel provided with a plurality of forked sprocket-plates separately connected to the opposite sides of the rim of the wheel and projecting beyond the periphery thereof, of a drive-chain consisting of a series of links, pivot-pins connecting the meeting ends of said links, and each pin having its opposite ends extended beyond the outer faces of the links and antifriction-rollers journaled on the said extended ends of the pivot-pins, said rollers being provided with concave peripheries and arranged to engage with the said forked sprocket-plates, substantially as described.

In testimony whereof I have hereunto set my hand in presence of two subscribing witnesses.

AUGUST C. SCHAEFER.

Witnesses:
WILLIAM M. CARSON,
M. G. HAGERTY.